June 21, 1960 S. S. GAGARIN 2,941,751
SPOILER FOR AIRCRAFT WINGS
Filed May 31, 1956 5 Sheets-Sheet 1
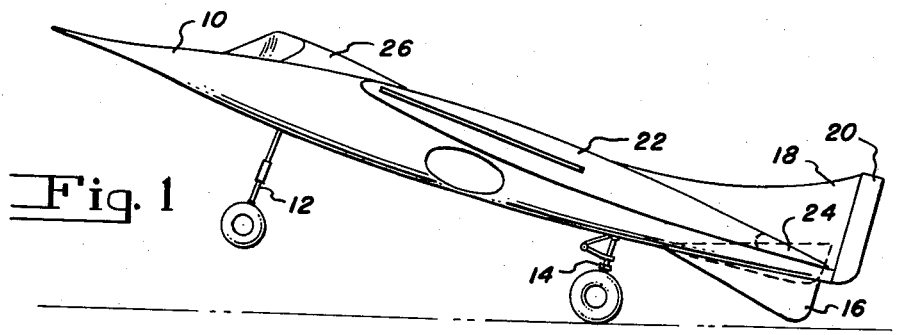
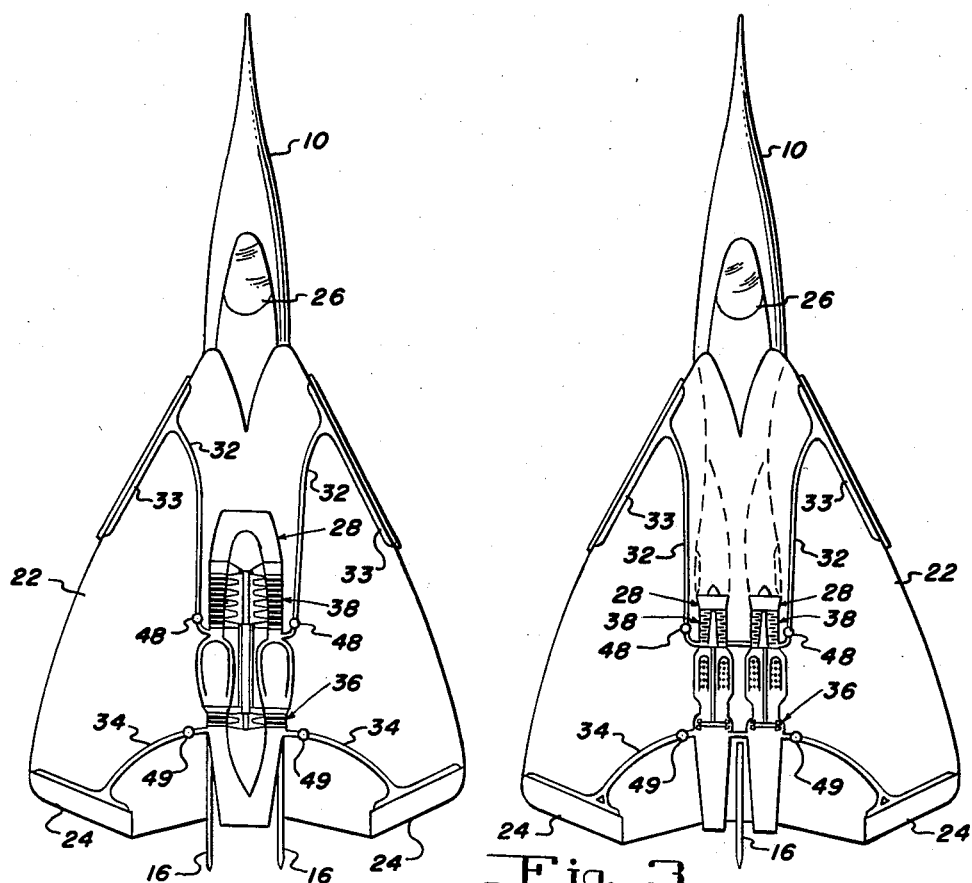
INVENTOR.
SERGE S. GAGARIN
BY Jack N. McCarthy June 21, 1960     S. S. GAGARIN     2,941,751
SPOILER FOR AIRCRAFT WINGS Filed May 31, 1956     5 Sheets-Sheet 2

*INVENTOR.*
SERGE S. GAGARIN

June 21, 1960  S. S. GAGARIN  2,941,751
SPOILER FOR AIRCRAFT WINGS
Filed May 31, 1956  5 Sheets-Sheet 3
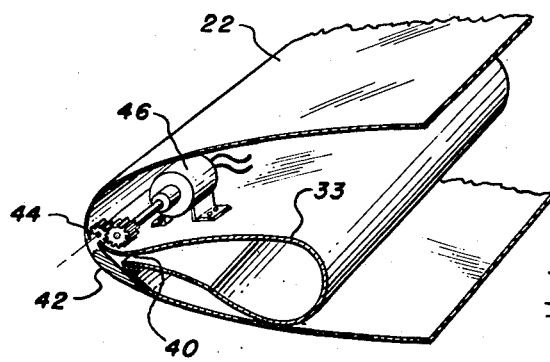
Fig. 8
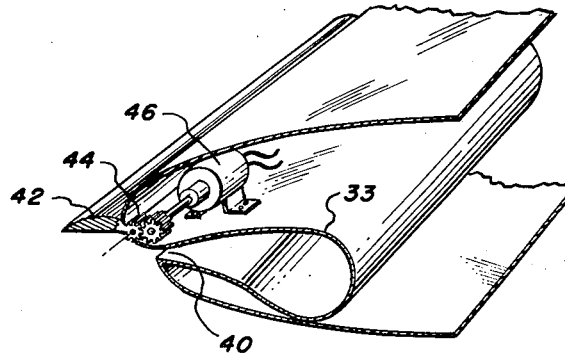
Fig. 9
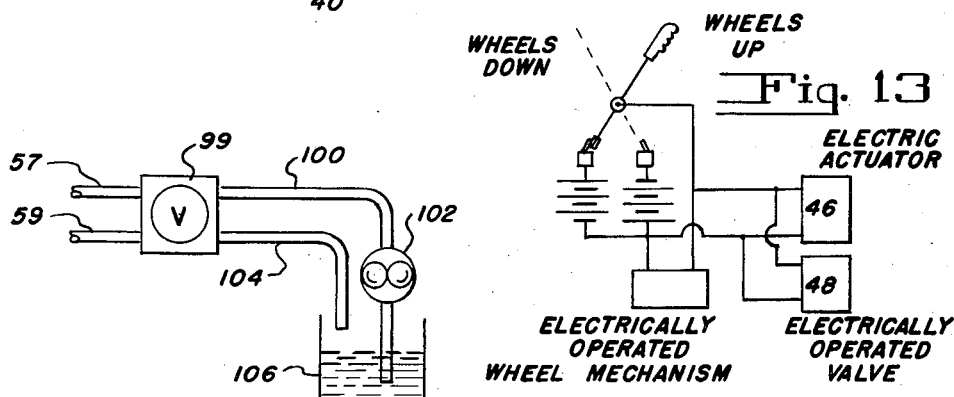
Fig. 13
Fig. 14
INVENTOR.
SERGE S. GAGARIN
BY June 21, 1960  S. S. GAGARIN  2,941,751
SPOILER FOR AIRCRAFT WINGS
Filed May 31, 1956  5 Sheets-Sheet 4

INVENTOR.
SERGE S. GAGARIN
BY

United States Patent Office 2,941,751
Patented June 21, 1960

2,941,751

SPOILER FOR AIRCRAFT WINGS

Serge S. Gagarin, Fairfield, Conn., assignor to United Aircraft Corporation, East Hartford, Conn., a corporation of Delaware Filed May 31, 1956, Ser. No. 588,469

17 Claims. (Cl. 244—42)

This invention relates to an aerodynamic control mechanism whereby the lifting capabilities of delta or high swept triangular wings may be substantially increased.

It is well known that airplanes having low aspect ratio planforms such as delta which are generally known as equilateral triangles or those of lower aspect ratios, such as shown in United States Patent No. 2,511,502 assigned to the same assignee as this application, do not produce high lift at low angles of attack as compared to wings of high aspect ratio which have a relatively higher lift slope.

It is an object of this invention to provide a high lift device for low aspect ratio wing aircraft which does not have the undesirable quality of producing a diving or pitching moment when the high lift device is operated such as is characteristic of the well-known flap now common on almost all current high aspect ratio wing aircraft and which when used must be counteracted, or trimmed, by down loads on tail surfaces or other wing trailing edges.

Another object is the application of such high lift devices to tailless aircraft while still maintaining a satisfactory margin of static stability.

A further object is to provide a high speed fighter or transport aircraft which is capable of transonic and supersonic speeds with a high lift device which will allow it to land at speeds slower than ordinarily associated with aircraft of this type and at a ground angle which will not require long landing gear and other similar structural weight penalties. It should be noted that, as a rule, practical consideration with regard to the ground angle limits do not permit the development of high wing angles of attack.

Another object is to provide means whereby the air flow over a swept leading edge, whether or not of triangular planform, may be controlled in such a way as to increase the lift of that wing without altering its pitching moment and whereby flow over control surfaces at the trailing edge of that wing may be maintained well beyond the normal stalling angle of said wing.

A further object is to provide a boundary layer control for a sustaining wing or airfoil which acts to generate a large vortex covering the area aft of the leading edge portion where the device is applied.

Another object is to provide a mechanism whereby this device can be controlled and retracted.

These and other objects and advantages of the invention will be apparent from the following detailed description and the appendant claims and from the accompanying drawings in which:

Fig. 1 is a side view of an airplane having a low aspect ratio shown in relation to its ground landing angle and a diagrammatic showing of a side view of the invention.

Fig. 2 is a plan view of the airplane in Fig. 1 showing a practical location of the invention on the leading edge of the wing and duct means interconnecting the gas turbine power plant with the invention and with the trailing edge control surfaces. This figure is characterized by a single engine installation with two vertical fins retractable as shown by the dotted line in Fig. 1.

Fig. 3 is an alternate plan view of the airplane of Fig. 1 characterized by a twin turbine installation showing the cross coupling of the turbines with the invention on the leading edge and with the control surfaces at the trailing edge.

Fig. 8 is a sectional view of the leading edge incorporating the invention when it is in the retracted position.

Fig. 9 is a sectional view of the leading edge incorporating the invention when it is in the extended position.

Fig. 13 is a schematic view of a combined control for the landing gear and spoiler.

Fig. 14 is a schematic view of a hydraulic unit control.

Figure 4:
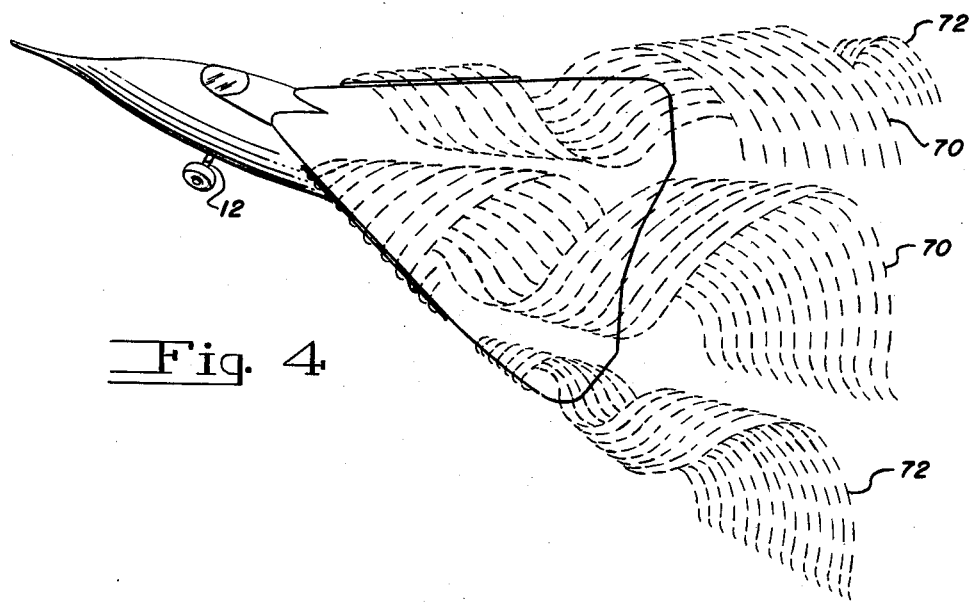
Fig. 4 is an isometric view of the airplane of Fig. 1 as it would appear in a landing or approach attitude showing the air flow produced by the invention as it is visualized in smoke stream lines as indicated by the stippled areas.

Figs. 1 through 3 illustrate an aircraft having a low aspect ratio sustaining wing. This shows a high speed aircraft having a fuselage of a single seater fighter; however, it can readily be seen that a transport aircraft such as shown in Figs. 13 through 16 of United States Patent No. 2,511,502 could also be used. The aircraft of Figs. 1 through 3 has a fuselage 10, a nose gear 12 and main gear 14. Both nose and main landing gear are retractable in normal flight. A fin or fins 16 which are retractable along the sides of the fuselage provide greater ground clearance on landing. A vertical fin 18 and rudder 20 are included along with the main sustaining wing 22 (for clarity the vertical fin 18 is not shown in the top views, Figs. 2 and 3). The main sustaining wing 22 has control surfaces 24 normally referred to as elevons. The fuselage 10 contains in its forward portion a cabin or cockpit 26 and in its after portion one or more jet or gas turbine engines 28.

The invention consists of a retractable fluid jet spoiler which, in its operative position, extends beyond the leading edge and somewhat ahead of it. Ducts 32, shown schematically connected as a bleed to the compressor section of the gas turbine 28, provide the fluid jet to a duct 33 located in the wing adjacent each spoiler. Turning vanes may be used as required to improve the distribution of the flow from duct 32 into duct 33. It should be noted that ducts 32 could be likewise connected to the combustion side of the gas turbine if care were taken to prevent corrosion of the leading edge surfaces and ducting material. It is to be understood that other suitable devices to supply a fluid under pressure could be used. In Fig. 3 where multiple engines are shown, the ducts 32 which supply the fluid to the spoilers are shown crosscoupled so that either gas turbine will equally supply both the right- and left-hand leading edge spoilers.

Each of the control surfaces 24 has ducts 34 connecting them with the gas turbine power section 36 but it is obvious that they could as well be connected to the bleed on the compressor section 38. These ducts supply high pressure air or gas over the control surfaces in a conventional manner whereby the gas or compressed air is discharged on the upper or lower surface of the control giving it a greater effectivity when desired. This flow may be controlled by valve means 49. This feature in combination with the jet spoiler improves the lift coefficient which may be developed by the jet spoiler alone.

It is to be understood that the bleed or combustion gases may be introduced to either the leading edge or trailing edge jets under normal flight conditions if desired by the pilot, such as in a maneuver where a possible stall might be expected. Their use and benefit, is however, of prime consideration when an approach and landing is to be made. Under these conditions, the full thrust of the gas turbines is not required for propulsion and bleeding off portions of this power to the leading edge spoiler of the sustaining surface substantially improves the lifting capacity of that surface. This improvement has been measured in wind tunnel tests to be better than that of the surface alone in the trimmed condition. The aerodynamic effect will be discussed later with reference to Fig. 12. Furthermore, it is possible that by introducing a portion of the jet engine power into the leading edge high lift device during take-off, take-off runs may be shortened and the end speed of take-off catapults on aircraft carriers may be reduced. Furthermore, by being able to control valves 48, the pilot can control the lift of the wing at any given angle of attack. For example, on a landing maneuver the pilot may extend the landing gear and spoiler during the approach and only open the valves 48 in the final phase of the approach. Upon ground contact the valves 48 may be closed to reduce the lift on the wing and the full jet thrust deflected into a thrust reversing system to brake the aircraft on the ground. Of course, partial opening of valves 48 would achieve intermediate results as would also partial extension of the spoilers. The angle at which the spoiler 42 in Figs. 8 and 9 is positioned and the amount of spoiler 52 or 62 in Figs. 10 and 11, respectively, is extended would control this effect.

Fig. 8 shows a section of a leading edge with a version of the invention as it might be applied to existing or new aircraft. A spoiler 42 in its retracted position forms a portion of the leading edge of that section of wing 22. A duct 33 is located within the wing along the length of the spoiler with a narrow slot 40 extending along its length opening forwardly. The spoiler 42 covers the slot 40 in its retracted position. Spoiler 42 is pivoted on an axis 44 so it can be rotated into an extended position as shown in Fig. 9. It is operated by an electric actuator 46 which is controllable by the pilot and which may be connected if desired to the landing gear extending controls as schematically shown in Fig. 13. While an electric actuator has been shown, it is to be understood that other types of actuators can be used. When the spoiler is extended as shown in Fig. 9, valves 48 (see Figs. 2 and 3) are opened when desired to permit the passage of high pressure air through duct 32 to duct 33 to exhaust forwardly under the spoiler 42.

Figure 10:
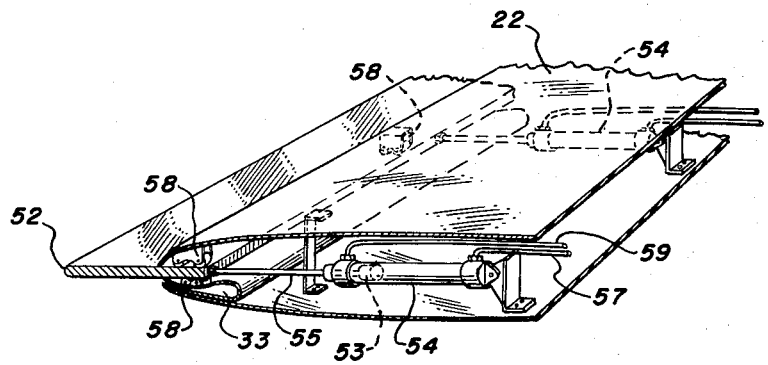
Fig. 10 is a modification of the invention shown in section in the extended position on the wing as in Fig. 8.

Fig. 10 shows a modification of the invention whereby the spoiler 52 is extended directly out of the leading edge of the wing. The spoiler is mounted in the forward part of the wing 22 for slidable movement. This slidable movement is provided for by roller means 58 mounted above and below the spoiler within the leading edge of the wing at spaced points along its length. These roller means also hold the spoiler from vertical movement. While one specific means has been shown, other equivalent means would be satisfactory. Hydraulic units 54 are provided to operate each spoiler 52. Each hydraulic unit 54 consists of a cylinder 51 and a piston 53 having a piston rod 55 extending therefrom. A conventional seal prevents leakage between said rod and cylinder. Each of the piston rods 55 are connected at their free ends to the rear portion of the spoiler 52. Each of the rear ends of the cylinders 51 are connected to a bracket fixed within the wing.

In Fig. 10 the spoiler is shown in its extended position. A pilot's hydraulic control (not shown) connects the right side of the pistons 53 of the controlling units 54 to an operative fluid through conduit 57 to place the spoiler in this extended position. When this spoiler is in an extended position, valves 48 (see Figs. 2 and 3) are opened when desired to permit passage of high pressure air through duct 32 to duct 33 to exhaust forwardly under the spoiler 52. The spoiler 52 can be retracted into intermediate positions and into the leading edge to form the leading edge radius or portion thereof. The pilot's hydraulic control in order to retract the spoiler 52 connects the left side of the pistons 53 (as shown in Fig. 10) to the operative fluid through conduit 59. The duct 33 would then remain open under all conditions of flight rather than covered as in Fig. 8. A separate means of closing this could be provided if necessary. It is anticipated, however, that a certain amount of blowing over the leading edge from the retracted spoiler may be beneficial during flight at higher Mach numbers. In addition, it is anticipated that differential operation of valves 48 would provide roll control which may be preferable to or supplement the elevon controls.

Figure 11:
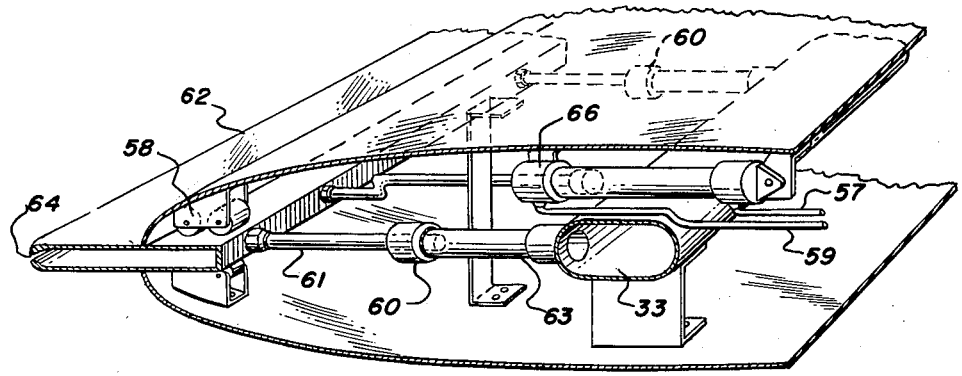
Fig. 11 is a further modification of the invention also shown in section in the extended position of the wing as in Fig. 8.

Fig. 11 shows a device similar to the device of Fig. 10 in which a duct 33 is located further to the rear of the leading edge. Duct 33 has a plurality of slip joint connections 60 with spoiler 62. Each connection consists of a tubular member 61 projecting rearwardly from spoiler 62 which telescopes within a tubular member 63 which projects forwardly from the duct 33. A conventional seal prevents leakage between members 61 and 63. In this instance the spoiler itself is hollow and has a slot 64 in its leading edge through which the high pressure air is exhausted. The arrows indicate the flow direction of the air when the device is under operating condition. Hydraulic servo unit 66, similar to those shown in Fig. 10 may be used to extend and retract the spoiler 62 which is held for slidable movement and against vertical movement by roller means 58. While no means of closing the slot in the retracted position is shown, if required a separate small external pivoted (as in Fig. 8) or slidable flap could be used with the modifications shown in Figs. 10 and 11 to close the gap in the retracted position. This small flap need only be of a width to cover the forward opening in the wing. The sizes of the openings and spoilers are not shown to scale in these views and their dimensions will vary for any particular configuration to which it is desired to apply them. From recent wind tunnel tests it was found that within limits a wider chord spoiler had a somewhat greater effect than a narrow chord spoiler and that its spanwise extent along the leading edge also had significance as to the overall trimmed lift coefficient which could be obtained with such a device.

It is obvious that the spoiler could be made in a series of separate sections which could be extended together or separately as desired to obtain the necessary increased lift. Furthermore, segmentation of these units would allow for the device to be applied to a leading edge which was not straight in planform but might be curved inwardly or outwardly or stepped.

While various complex control arrangements can be used, each valve 48, valve 49 and spoiler (42, 52 and 62) is provided with an individual actuating pilot's control which can place its cooperating valve in a fully open, fully closed or intermediate position and its cooperating spoiler in a fully extended, fully retracted or intermediate position. In the modification shown in Fig. 8, the spoiler is locked in an intermediate position through the gearing mechanism to the electric actuator 46 which is locked when no current is flowing thereto. In Figs. 10 and 11 the hydraulic units may be operated by a mechanism such as shown in Fig. 14 which includes a reversing and cutoff valve 99. Conduits 57 and 59 of the hydraulic units are connected through said valve by a pressure line 100, including a pump 102, and a drain line 104 with a fluid supply tank 106. Reversing and cutoff valve 99 can direct fluid to either side of the hydraulic unit and connect the other side to drain or lock the fluid on both sides of the piston of the hydraulic unit at any position.

A device as applied to the low aspect ratio delta wing is shown in Figs. 1 and 2 applied to the inboard portion of the wing's leading edge. Its aerodynamic effect appears to be that of forming a large vortex 70 over the inboard portion of the wing as shown in Fig. 4. This vortex is formed at a low angle of attack such as 15° or 20° and covers substantially the area of the wing not already swept by the normal tip vortex 72, also shown schematically in Fig. 4. Apparently this high energy vortex flow acts to increase the lifting capacity of the wing but does not introduce a negative pitching moment which is normally associated with conventional high lift devices such as flaps.

Figures 5, 6:
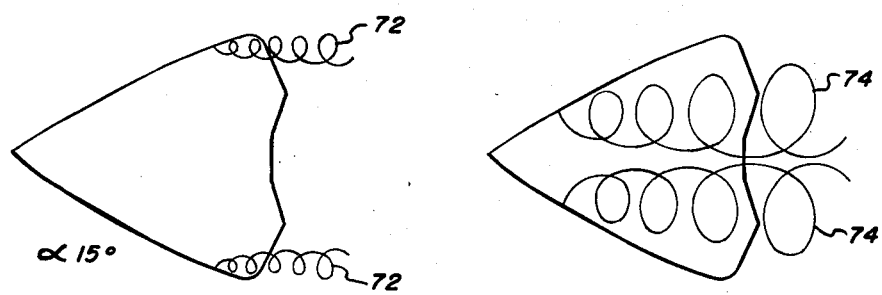
Fig. 5 is a diagrammatic plan view of a low aspect ratio airplane wing at an angle of attack of approximately 15° to 20° showing the normal tip vortex associated with that angle.
Fig. 6 is a diagrammatic plan view of a similar wing showing the vortices which are produced at approximately a 40° angle of attack.

Fig. 5 shows the general extent of the tip vortices 72 which would normally occur at an angle of attack of 15° to 20° on a low aspect ratio planform.

Fig. 6 shows the large vortices 74 which are formed at an angle of attack of approximately 40° on a low aspect ratio planform. At this high angle of attack the lift coefficient obviously increases and the wing when used on a tailless configuration may be trimmed out in the neighborhood of a $C_L$ max=0.75. However, the ground angle in this condition would be prohibitive for landings. It would require the aircraft to approach in an extremely nose high attitude with its main gear extended below the line of ground contact. This is one reason low aspect ratio delta wings have not been adopted for general use either for fighter or transport aircraft. The use of the jet spoiler of this invention overcomes this major objection.

Figure 7:
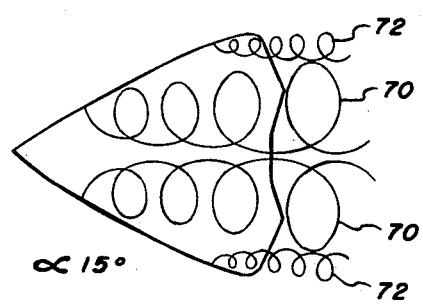
Fig. 7 is a diagrammatic plan view of a similar wing including the invention and showing the vortices produced by the invention at a landing angle of approximately 15° to 20° in addition to those normally produced by the wing alone at that angle.
Figure 12:
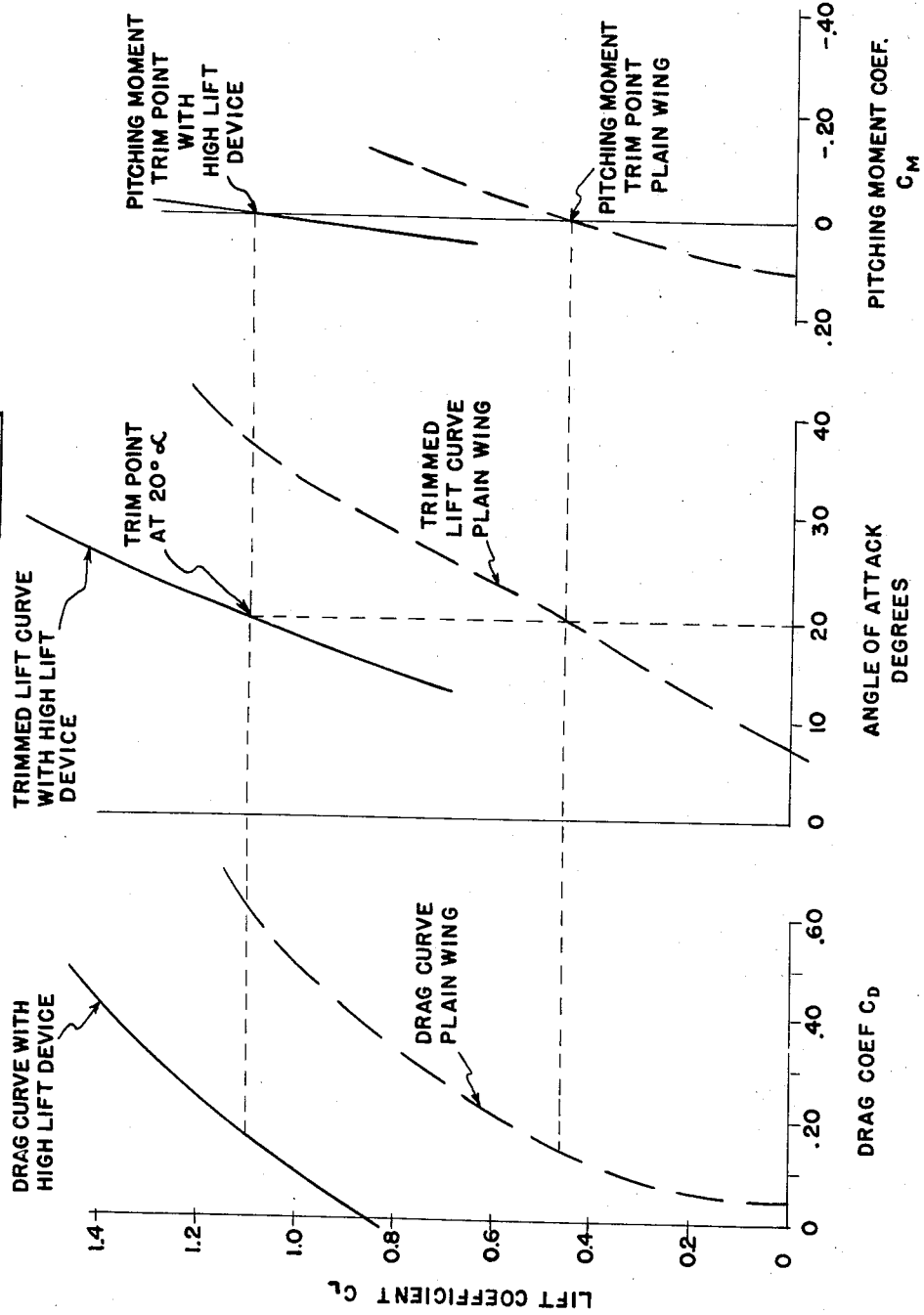
Fig. 12 is a graph showing the plots of trimmed lift, drag and pitching moment of a tailless airplane having a triangular wing of aspect ratio of approximately 1.3 with and without the invention showing the increase of lift coefficient and lift slope due to the invention when trimmed at a 20° angle of attack.

Fig. 7 shows schematically the vortex 70 created by the powered spoiler of this invention which is similar in nature to the one (74) which occurs at approximately the 40° angle of attack but which now can be produced at a low angle of from approximately 15° to 20°. In addition, the normal tip vortex 72 which occurs at 15° to 20° completes the aerodynamic flow picture on the upper surface of the wing. Together, these four vortices sweep the upper surface of the wing with a powerful airstream and produce the increased lift of the wing as shown in Fig. 12.

It is further noted that the drag coefficient (at the same angle of attack) is increased slightly from that of the plain wing. The curves of Fig. 12 are taken from a wind tunnel test of scale models of aircraft including the invention. A model having a triangular wing of aspect ratio 1.27 when trimmed out at a 20° angle of attack without the use of the invention produced a lift coefficient of about 0.45 (which is as expected in such a planform) and a drag coefficient of about 0.13. When the jet spoiler was tested it was possible to trim out the model at a 20° angle of attack at a lift coefficient of over 1.1 and a drag coefficient of about 0.15. At this latter condition of trim the elevons remained at a zero setting and no other trailing edge control device was used. The slope of the pitching moment had a positive stability margin of about 11 percent which is considered adequate for aircraft of this type. Of course, in either case the model tested was tailless and needed to be trimmed entirely by means available on the wing itself. If the weight and drag penalty of a tail surface were allowed, undoubtedly trim at higher lift coefficient could be obtained at the same angles of attack by downward deflection of the elevons 24 or trailing edge flaps (not shown in this application).

Thus, it can be seen that the high speed planform of a tailless sharply swept delta can now be made to operate at higher lift coefficients than normally associated with a wing of that type and can expect a lower landing and take-off speed at reasonable ground angles and consequent improved safety of operation.

I claim:

1. In an aircraft, a wing having a first leading edge and a trailing edge, said first leading edge being swept rearwardly, means projecting forwardly of said first leading edge having a second leading edge, said means having an upper and lower surface, a source of fluid under pressure, and duct means connected to said source of fluid under pressure having an outlet adjacent said means for directing said fluid forwardly, said outlet being rearward of said second leading edge and below said upper surface, whereby under certain operating conditions said fluid will flow forwardly to said second leading edge and upwardly and rearwardly over said upper surface.

2. In an aircraft, a wing having a first leading edge and a trailing edge, said wing having an upper and lower surface, said first leading edge being swept rearwardly, means projecting into the free airstream in front of said first leading edge having a second leading edge, said means having an upper and lower surface, a source of fluid under pressure, and duct means connected to said source of fluid under pressure having an outlet adjacent said means for directing said fluid towards said second leading edge, said outlet being spaced from said second leading edge in a direction towards said first leading edge and below said upper surface of said projecting means, whereby under certain operating conditions said fluid will flow to said second leading edge and upwardly and rearwardly over said upper surfaces of said means and wing.

3. In an aircraft, a wing having a first leading edge and a trailing edge, said first leading edge being swept rearwardly, said wing having a chordline, means projecting into the free airstream in front of said first leading edge having a second leading edge, said means having an upper and lower surface, said means having a chordline, the chordline of said means being near to a plane extending through the chordline of said wing, a source of fluid under pressure, and duct means connected to said source of fluid under pressure having an outlet adjacent said means for directing said fluid towards said second leading edge, said outlet being spaced from said second leading edge in a direction towards said first leading edge and below said upper surface, whereby under certain operating conditions said fluid will flow to said second leading edge and upwardly and rearwardly over said upper surface of said means.

4. In an aircraft, a wing having a generally triangular planform with two forwardly converging sides forming the leading edge, the remaining side forming the trailing edge, means projecting into the free airstream in front of each of the converging sides, each means having a second leading edge, each means having an upper and lower surface, a source of fluid under pressure, and duct means connected to said source of fluid under pressure having an outlet adjacent each means for directing said fluid towards said second leading edge of said means, each outlet being spaced from it cooperating second leading edge in a direction towards said first leading edge and below its cooperating upper surface, whereby under certain operating conditions said fluid will flow to said second leading edge and upwardly and rearwardly over said upper surface.

5. An aircraft as defined in claim 1, wherein said projecting means is moveable.

6. An aircraft as defined in claim 2, wherein said projecting means is mounted in said wing for slidable movement.

7. An aircraft as defined in claim 4, including means for moveably mounting each projecting means, and means for actuating each of said projecting means.

8. An aircraft as defined in claim 1, wherein said projecting means extends from said wing in a direction so that it lies on or near a plane extending through the chordline of said wing.

9. An aircraft as defined in claim 1, including means for slidably moving said projecting means from its projecting position to a position forming part of the wing.

10. An aircraft as defined in claim 2, wherein said projecting means extends in length along the inboard portion of the first leading edge.

11. An aircraft as defined in claim 2, wherein said projecting means is mounted on said wing for pivotal movement.

12. An aircraft as defined in claim 2, wherein said projecting means comprises a flat member, and said outlet is also located below the lower surface of said projecting means.

13. An aircraft as defined in claim 1, including means for mounting said projecting means for slidable movement in the forward part of said wing, said mounting means including upper and lower bearing means positioned within said wing between which said projecting means move, and means for slidably moving said projecting means within said mounting means.

14. An aircraft as defined in claim 1, wherein said trailing edge has a rear control surface, and second duct means connected to said source of fluid under pressure for directing fluid over the rear control surface.

15. In an aircraft, a wing having a first leading edge and a trailing edge, said wing having an opening therein, a spoiler mounted in said wing for slideable movement, said spoiler having a second leading edge and an upper and lower surface, means for moving said spoiler from a retracted position with respect to said wing to a projected position where said spoiler projects a substantial distance forwardly of the first leading edge of said wing, a source of fluid under pressure, and duct means connected to said source of fluid under pressure having an outlet adjacent said spoiler for directing said fluid forwardly, said outlet being below said upper surface and rearward of the second leading edge of said spoiler in its projected position whereby under certain operating conditions said fluid will flow forwardly to said second leading edge and upwardly and rearwardly over said upper surface.

16. In an aircraft, a wing having a first leading edge and a trailing edge, said wing having an opening therein, a spoiler, means in said wing mounting said spoiler for slideable movement, said spoiler having a second leading edge and an upper and lower surface, means for moving said spoiler from a retracted position with respect to said wing to a projecting position where said spoiler projects a substantial distance forwardly of the first leading edge of said wing, a source of fluid under pressure, and duct means connected to said source of fluid under pressure having an outlet adjacent said spoiler for directing said fluid forwardly, said outlet being below said upper surface and rearward of the second leading edge of said spoiler in its projecting position whereby under certain operating conditions said fluid will flow forwardly to said second leading edge and upwardly and rearwardly over said upper surface.

17. In an aircraft, a wing having a first leading edge and a trailing edge, said wing having an opening therein, a spoiler, means in said wing mounting said spoiler for slideable movement, said spoiler having a second leading edge and an upper and lower surface, means for moving said spoiler from a retracted position with respect to said wing where said second leading edge forms part of the leading edge of said wing to a projecting position where said spoiler projects forwardly of the first leading edge of said wing, a source of fluid under pressure, and duct means connected to said source of fluid under pressure having an elongated outlet means adjacent said spoiler for directing said fluid forwardly, said elongated outlet means extending lengthwise along the span of said wing below said upper surface and rearward of the second leading edge of said spoiler in its projecting position whereby under certain operating conditions said fluid will flow forwardly to said second leading edge and upwardly and rearwardly over said upper surface.

References Cited in the file of this patent

UNITED STATES PATENTS

| | | |
|---|---|---|
| 1,580,577 | Baumann | Apr. 13, 1926 |
| 2,157,281 | Coanda | May 9, 1939 |
| 2,357,680 | Molloy | Sept. 5, 1944 |
| 2,478,793 | Trey | Aug. 9, 1949 |
| 2,503,585 | Loedding | Apr. 11, 1950 |
| 2,545,010 | Stalker | Mar. 13, 1951 |
| 2,743,888 | Lippisch | May 1, 1956 |

FOREIGN PATENTS

| | | |
|---|---|---|
| 501,548 | Germany | July 4, 1930 |
| 725,194 | Germany | Sept. 16, 1942 |

OTHER REFERENCES

"High-Lift Devices and Tailless Aeroplanes," pages 292–297, Aircraft Engineering Magazine, Oct. 1945.